United States Patent [19]

Brunette et al.

[11] 4,121,961

[45] Oct. 24, 1978

[54] METHOD OF LABEL INSTALLATION

[76] Inventors: Jerome J. Brunette, 911 Cambridge Dr., Libertyville, Ill. 60048; William G. Fogleson, 5098 Deep Point Dr., Kalamazoo, Mich. 49002

[21] Appl. No.: 788,457

[22] Filed: Apr. 18, 1977

[51] Int. Cl.[2] ........................ B32B 31/20; B41M 5/22

[52] U.S. Cl. .................................... 156/249; 40/2 R; 40/615; 156/277; 156/288; 156/289; 282/27.5; 283/9 R; 283/21; 400/241.2; 427/7; 427/150; 427/207 B; 427/337; 428/40; 428/307; 428/914; 428/915

[58] Field of Search ............... 156/249, 277, 234, 235, 156/288, 289, 247; 427/150, 151, 207 B, 7, 337, 256; 428/40, 914, 202, 307, 915; 282/27.5; 101/DIG. 1; 35/26, 27; 197/6.7; 40/2 R, 125 A, 135, 360, 594, 615; 283/8 R, 9 R, 21; 400/241.2

[56] References Cited

U.S. PATENT DOCUMENTS

| | | | |
|---|---|---|---|
| 2,302,179 | 11/1942 | Bronfman | 156/277 X |
| 2,550,473 | 4/1951 | Green et al. | 428/307 |
| 3,020,171 | 2/1962 | Bakan et al. | 428/307 X |
| 3,383,121 | 5/1968 | Singer | 428/41 X |
| 3,974,311 | 8/1976 | Cherrin | 427/207 B X |
| 3,981,523 | 9/1976 | Maalouf | 427/150 X |
| 4,021,060 | 5/1977 | Seeley et al. | 156/277 X |

*Primary Examiner*—William A. Powell
*Assistant Examiner*—Thomas Bokan
*Attorney, Agent, or Firm*—Tilton, Fallon, Lungmus & Chestnut

[57] ABSTRACT

A method of label installation employing two sheets suitably coated to produce an image on the underside of the upper transparent sheet and thereafter applying the upper sheet to a label receiving surface.

2 Claims, 4 Drawing Figures

METHOD OF LABEL INSTALLATION

BACKGROUND AND SUMMARY OF INVENTION

This invention relates to a method of label installation and, more particularly, to a method wherein a label can be created rapidly and thereafter serve its function in an essentially unalterable condition. To this end, a pair of sheets are initally provided which are disposed in face-to-face relationship with the upper of the sheets being generally transparent. This upper sheet has on its underside a coating containing an image precursor. The lower of the sheets has on its top side a coating containing an image developer, thereby providing the partner in the two ink image development system. When pressure, as by pencil, typewriter, etc. is applied to the assembled sheets, an image is created on the underside of the upper sheet. Thereafter, the sheets can be separated and the upper sheet applied to a surface requiring indentification, i.e., labeling. Once the sheets are separated, no further image development is possible because the developing partner is absent.

The instant invention fills the need which has existed for a long time in providing a speedy, yet reliable method for labeling and wherein the label indicia, once created, remain essentially unalterable.

Other objects and advantages of the invention may be seen in the details of construction and operation as set forth in the ensuing specification.

DETAILED DESCRIPTION

The invention is described in conjunction with an illustrative embodiment in the accompanying drawing, in which FIG. 1 is a perspective view essentially schematic of a label assembly incorporating teachings of this invention;

Figure 1:
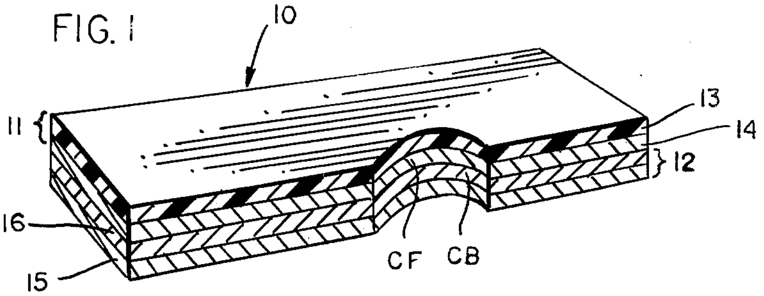

In the illustration given and with reference first to FIG. 1, the numeral 10 designates generally a label assembly incorporating teachings of the instant invention. The label assembly 10 is made up essentially of two sheets, i.e., and upper sheet 11 and a lower sheet 12 arranged in face-to-face contacting relation. Advantageously, the upper sheet 11 includes a transparent plastic film 13 which has on its underside a coating 14 having dispersed therein an image precursor. For the sake of ease of expression to those skilled in this art, the precursor is designated CF, referring to a known technology commonly referred to as NCR papers wherein the precursor of the ink dye or image is designated CF.

The lower sheet 12 is advantageously constructed of a liner 15 which may be of paper and which has a coating 16 on the upper side thereof which contains an image developer, i.e., the CB partner of the CF precursor.

Figure 2:
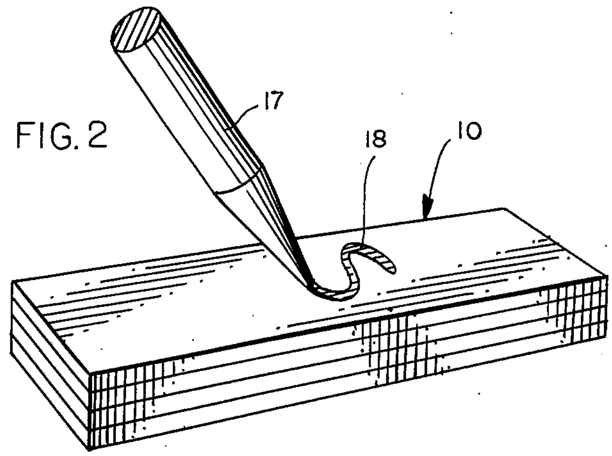
FIG. 2 is a view similar to FIG. 1 but depicting schematically the creation of an image on the label assembly of FIG. 1.

Referring now to FIG. 2, the assembly 10 is seen to be in the process of being inscribed by a suitable instrument or device 17 so as to create an image 18 which will appear on the underside of the upper sheet 11.

Figure 3:
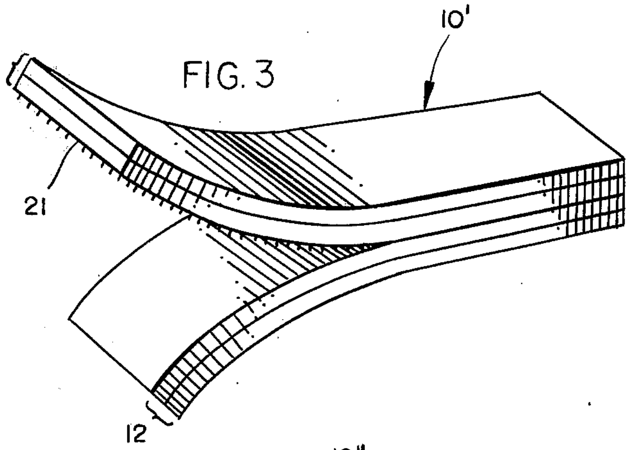
FIG. 3 is another perspective schematic view showing the portions of the label assembly in the process of being separated.

In FIG. 3, the assembly (now designated 10') is seen in the process of disassembly, i.e., separating the two sheets 11 and 12. The sheet 12 is discarded and as can be appreciated from a consideration of FIG. 4, the resultant portion of the label assembly (now designated 10'') is applicable as indicated as at 19 to a label-receiving surface 20 (schematically depicted).

Figure 4:
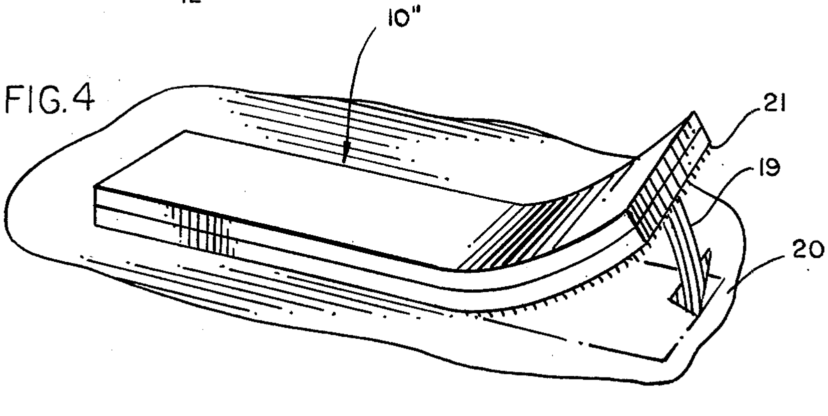
FIG. 4 is yet another perspective schematic view showing the final label in the process of being installed on a label receiving surface.

In one preferred embodiment of the invention, the coating 14 is constructed to include an adhesive which is schematically represented as at 21 in FIGS. 3 and 4.

The adhesive may take the form of a pressure sensitive adhesive or one which is either solvent or heat activatable. When a pressure sensitive adhesive is employed, it is possible to develop a bonding strength greater than the tear strength of the sheet 11 so that additional tamperproof character is developed.

Upon separation of the two sheets or plies (and for this purpose, the coating 16 may include a silicon component for ready release when the adhesive 21 is pressure sensitive), the upper sheet is immediately applicable to a label receiving surface. Other attachment means such as tape, staples, etc. may also be employed.

While in the foregoing specification a detailed description of an embodiment of the invention has been set down for the purpose of illustration, many variations in the details herein given may be made by those skilled in the art without departing from the spirit and scope of the invention.

I claim:

1. A method of label installation comprising disposing two sheets in face-to-face relation with the upper of said sheets being generally transparent plastic film and having on the underside a coating containing an image precursor, the lower of said sheets being paper and having on the top side thereof a coating containing an image developer, applying pressure to said sheets to create an image on said upper sheet, separating said sheets, and applying said upper sheet to a label receiving surface whereby said label is essentially unalterable.

2. The method of claim 1 in which said upper sheet is equipped on its under side with an adhesive.

* * * * *